US011904933B2

(12) United States Patent
Ku et al.

(10) Patent No.: US 11,904,933 B2
(45) Date of Patent: Feb. 20, 2024

(54) STEERING COLUMN FOR VEHICLE

(71) Applicant: HL MANDO CORPORATION, Pyeongtaek-si (KR)

(72) Inventors: Sang Chul Ku, Seoul (KR); Sung Hun Park, Anyang-si (KR); Kwon Ho Lee, Yongin-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 0 days.

(21) Appl. No.: 17/642,158

(22) PCT Filed: Sep. 1, 2020

(86) PCT No.: PCT/KR2020/011706
§ 371 (c)(1),
(2) Date: Mar. 10, 2022

(87) PCT Pub. No.: WO2021/049803
PCT Pub. Date: Mar. 18, 2021

(65) Prior Publication Data
US 2022/0324505 A1     Oct. 13, 2022

(30) Foreign Application Priority Data
Sep. 10, 2019  (KR) .......................... 10-2019-0111842

(51) Int. Cl.
*B62D 1/187*        (2006.01)
*B62D 1/181*        (2006.01)
(Continued)

(52) U.S. Cl.
CPC ............. *B62D 1/187* (2013.01); *B62D 1/181* (2013.01); *B62D 1/185* (2013.01); *B62D 1/192* (2013.01)

(58) Field of Classification Search
CPC ........ B62D 1/187; B62D 1/181; B62D 1/185; B62D 1/192; B62D 1/183; B62D 1/184;
(Continued)

(56) References Cited

U.S. PATENT DOCUMENTS 5,036,720 A  *  8/1991  Shirasawa ............... B62D 1/181
                                                          74/89.42
5,178,411 A  *  1/1993  Fevre ..................... B62D 1/181
                                                          280/775
(Continued)

FOREIGN PATENT DOCUMENTS

CN         202071872 U      12/2011
CN         104071206 A      10/2014
(Continued)

OTHER PUBLICATIONS

International Search Report dated Nov. 27, 2020, corresponding to International Application No. PCT/KR2020/011706.
(Continued)

*Primary Examiner* — Drew J Brown
(74) *Attorney, Agent, or Firm* — Hauptman Ham, LLP

(57) ABSTRACT

According to a steering column for a vehicle according to the present embodiments, a wide convenient space can be secured for a driver in a teles-in state by increasing a teles-stroke while securing an installation space for the steering column, the installation of the steering column is spatially convenient despite the increased teles-stroke, and a teles operation can be quickly performed without increasing the output of a motor, and thus a convenient space can be quickly secured for a driver without degraded noise performance.

13 Claims, 13 Drawing Sheets

(51) Int. Cl.
  *B62D 1/185* (2006.01)
  *B62D 1/19* (2006.01)
(58) Field of Classification Search
  CPC .. F16H 25/22; F16H 55/22; F16H 2025/2059; B60Y 2306/09
  See application file for complete search history.

(56) References Cited

U.S. PATENT DOCUMENTS

| | | | | |
|---|---|---|---|---|
| 6,079,743 | A * | 6/2000 | Grams | B62D 1/181 280/775 |
| 6,142,523 | A * | 11/2000 | Bathis | B62D 1/181 280/777 |
| 7,048,305 | B2 | 5/2006 | Muller | |
| 7,159,904 | B2 * | 1/2007 | Schafer | B62D 1/181 280/775 |
| 8,161,839 | B2 * | 4/2012 | Warashina | B62D 1/181 74/493 |
| 9,260,130 | B2 * | 2/2016 | Mizuno | B62D 1/187 |
| 10,228,047 | B2 * | 3/2019 | Nunez | F16H 25/20 |
| 10,577,010 | B2 * | 3/2020 | Derocher | B62D 1/183 |
| 2008/0216597 | A1 | 9/2008 | Iwakawa et al. | |
| 2017/0363189 | A1 * | 12/2017 | Nunez | F16H 25/2006 |
| 2019/0210632 | A1 | 7/2019 | Derocher et al. | |
| 2019/0210633 | A1 * | 7/2019 | Derocher | B62D 1/181 |
| 2021/0061340 | A1 * | 3/2021 | Wilkes | B62D 1/185 |

FOREIGN PATENT DOCUMENTS

| | | |
|---|---|---|
| CN | 106394647 A | 2/2017 |
| CN | 206520645 U | 9/2017 |
| CN | 107985387 A | 5/2018 |
| JP | 2004-306728 A | 11/2004 |
| JP | 2012-218543 A | 11/2012 |
| KR | 10-2005-0008354 A | 1/2005 |
| KR | 10-0494940 B1 | 6/2005 |
| KR | 10-0559844 B1 | 3/2006 |
| KR | 10-0866538 B1 | 11/2008 |

OTHER PUBLICATIONS

Office Action dated Dec. 25, 2023 for corresponding Chinese Patent Application No. 202080063898.0, along with partial English translation (14 pages).

* cited by examiner

STEERING COLUMN FOR VEHICLE

CROSS-REFERENCE TO RELATED APPLICATION

This application is a national phase of PCT/KR2020/011706 filed on Sep. 1, 2020, which is based on and claims priority to Korean Patent Application No. 10-2019-0111842 filed on Sep. 10, 2019, the disclosures of which are incorporated by reference herein in their entireties.

TECHNICAL FIELD

The present embodiments relate to a steering column for a vehicle and, more specifically, to a steering column for a vehicle, which allows for securing of a wide space for the driver's convenience in a telescope-in state by increasing the telescope stroke while securing a space for installing the steering column, spatially easier installation of the steering column despite the increased telescope stroke, and quick telescopic motion without increasing motor power, thereby rapidly securing a space for the driver's convenience without degrading anti-noise capability.

BACKGROUND ART

In general, the steering column of a vehicle comes with telescoping and tilting features by which the driver may adjust the protrusion and tilt angle of the steering wheel to fit his height or body shape to enable smooth steering.

Recently being developed are vehicles capable of self-driving to the destination even without the driver's manipulation on the steering wheel, accelerator pedal, and brake, and a demand arises for securing a larger space for the driver's convenience while self-driving.

To that end, an attempt is being made to increase the telescope-in stroke of the steering shaft. In conventional steering columns that telescope using a screw, lengthening the screw may excessively increase the overall length of the steering column, and increasing the lead of the screw may be difficult to realize given the self-locking condition of the screw.

Further, increasing the stroke requires increasing the telescope speed. Increasing the motor power for the purpose of quicker telescoping is disadvantageous in light of noise, weight, and size. Thus, a need exists for a more appropriate approach.

DETAILED DESCRIPTION OF THE INVENTION

Technical Problem

The present embodiments have been conceived in light of the foregoing background and relate to a steering column for a vehicle, which allows for securing of a wide space for the driver's convenience in a telescope-in state by increasing the telescope stroke while securing a space for installing the steering column, spatially easier installation of the steering column despite the increased telescope stroke, and quick telescopic motion without increasing motor power, thereby rapidly securing a space for the driver's convenience without degrading anti-noise capability.

Technical Solution

According to the present embodiments, there may be provided a steering column for a vehicle, comprising a mounting bracket having a lower end coupled with a first nut screw, an upper column having an outer circumferential surface coupled with a second nut screw, and a lower column including a first bolt screw including a first bolt part coupled to the first nut screw and a second bolt part coupled to the second nut screw and a telescope driving unit including a first motor for rotating the first bolt screw.

Advantageous Effects

According to the present embodiments, it is possible to allow for securing of a wide space for the driver's convenience in a telescope-in state by increasing the telescope stroke while securing a space for installing the steering column, spatially easier installation of the steering column despite the increased telescope stroke, and quick telescopic motion without increasing motor power, thereby rapidly securing a space for the driver's convenience without degrading anti-noise capability.

MODE FOR CARRYING OUT THE INVENTION

Figure 1:
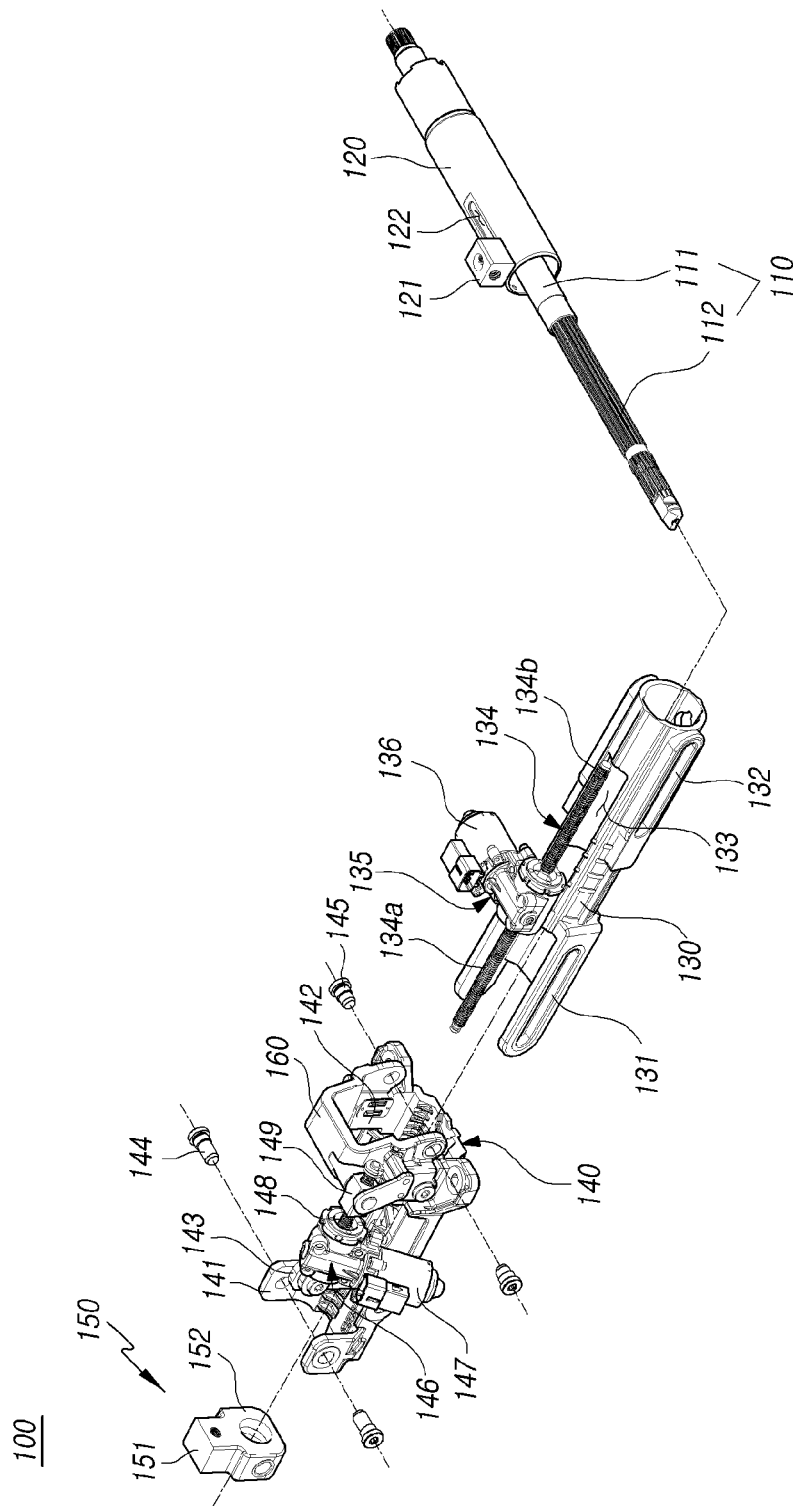
FIG. 1 is an exploded perspective view illustrating a steering column for a vehicle according to the present embodiments.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 2:
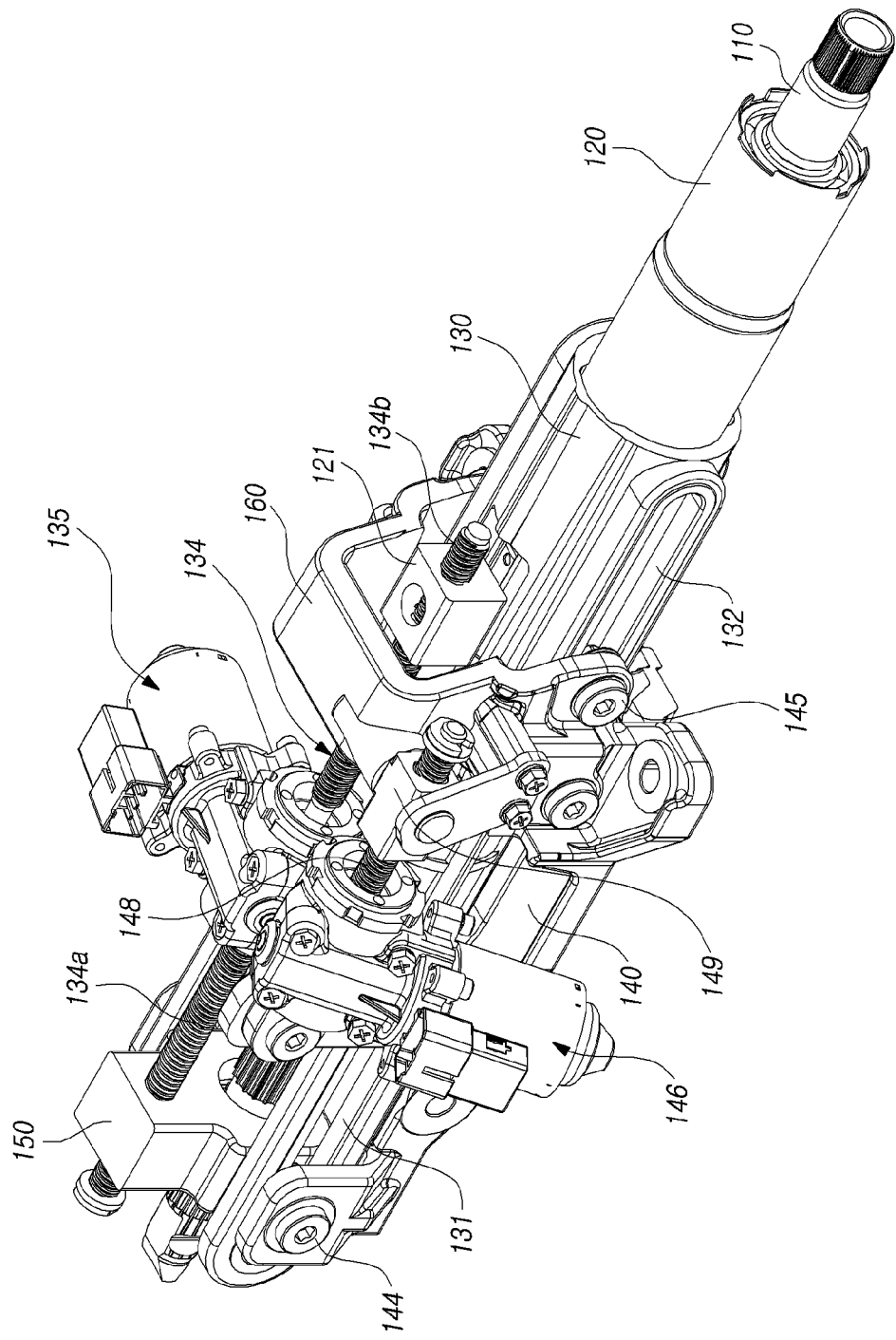
FIGS. 2 to 4 are a perspective view, a side view, and a plan view illustrating the assembled state of FIG. 1.
Figure 3:
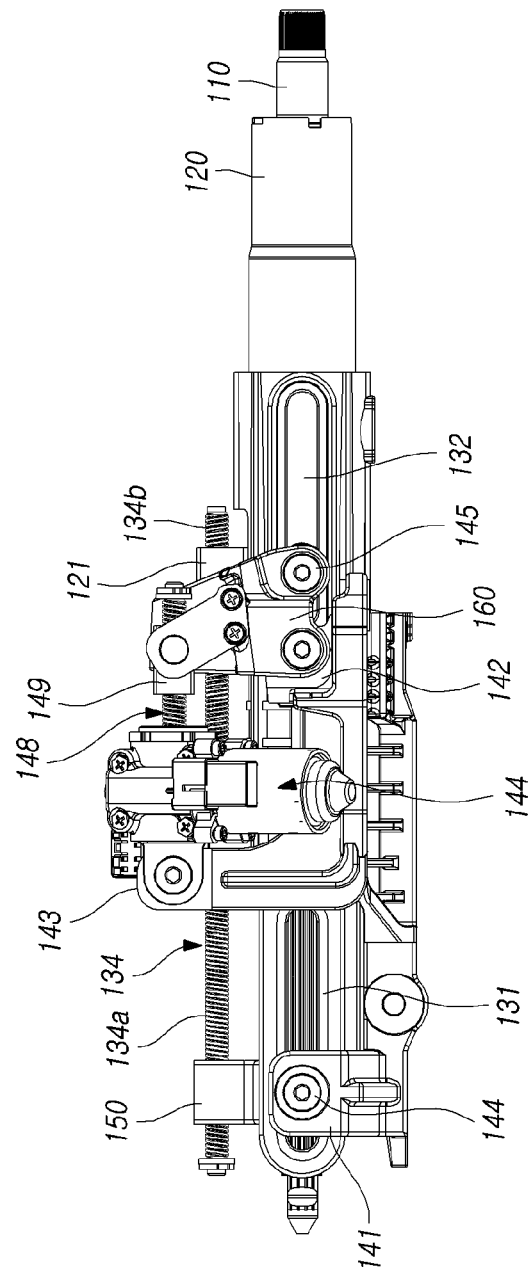
Figure 4:
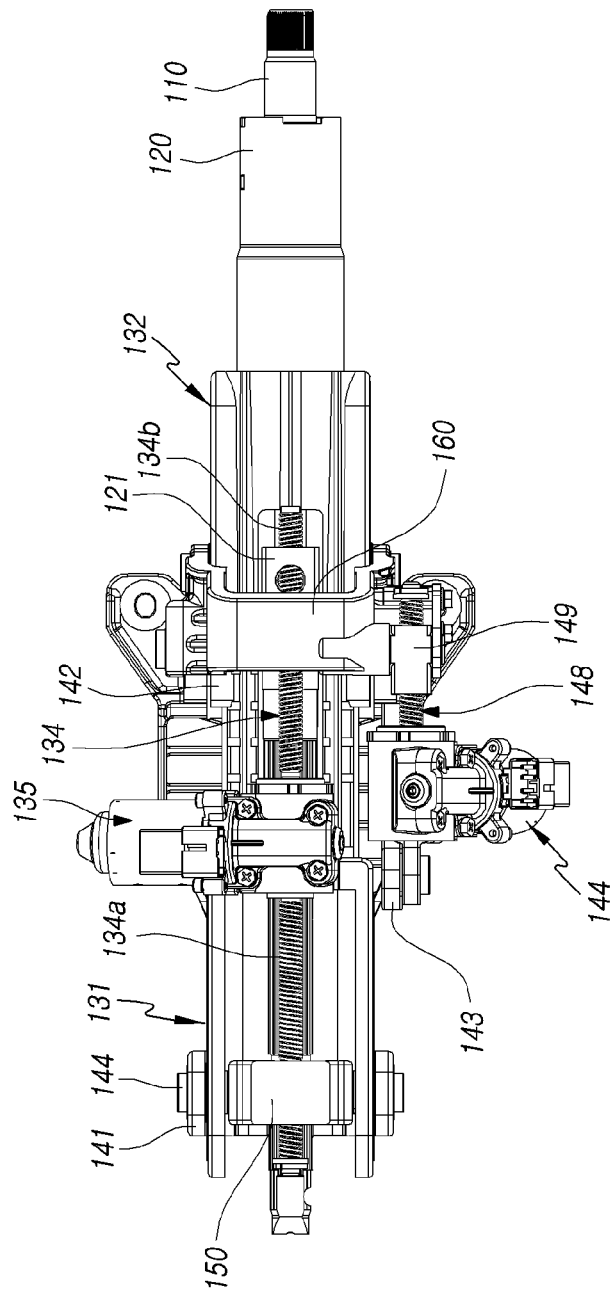
Figure 5:
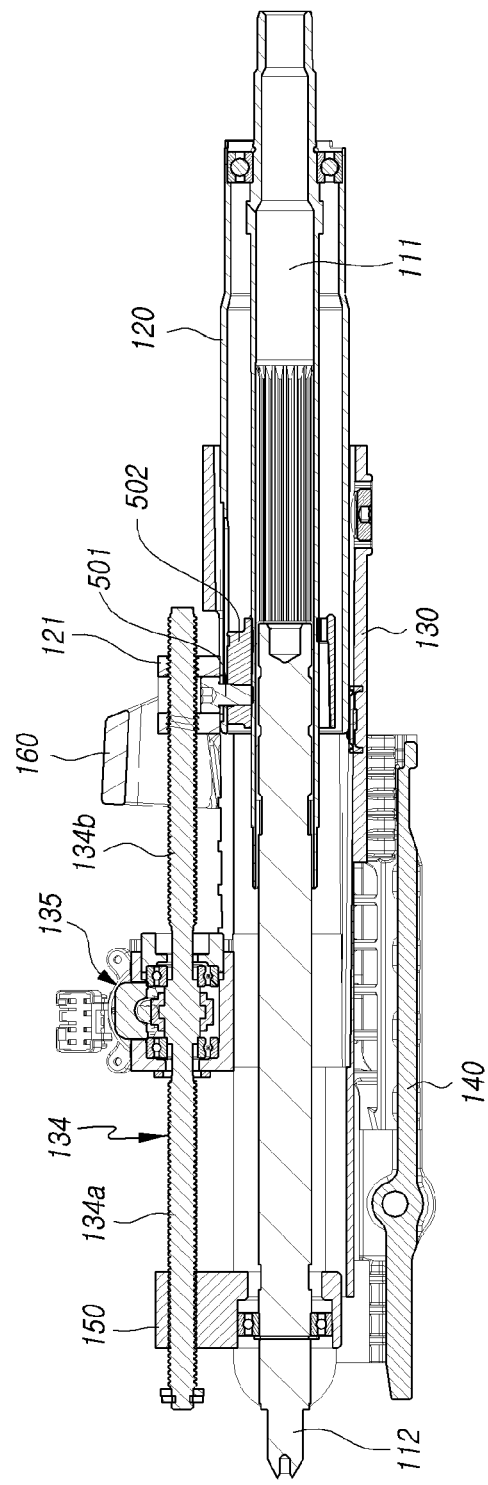
FIG. 5 is a cross-sectional view of FIG. 3.
Figure 6:
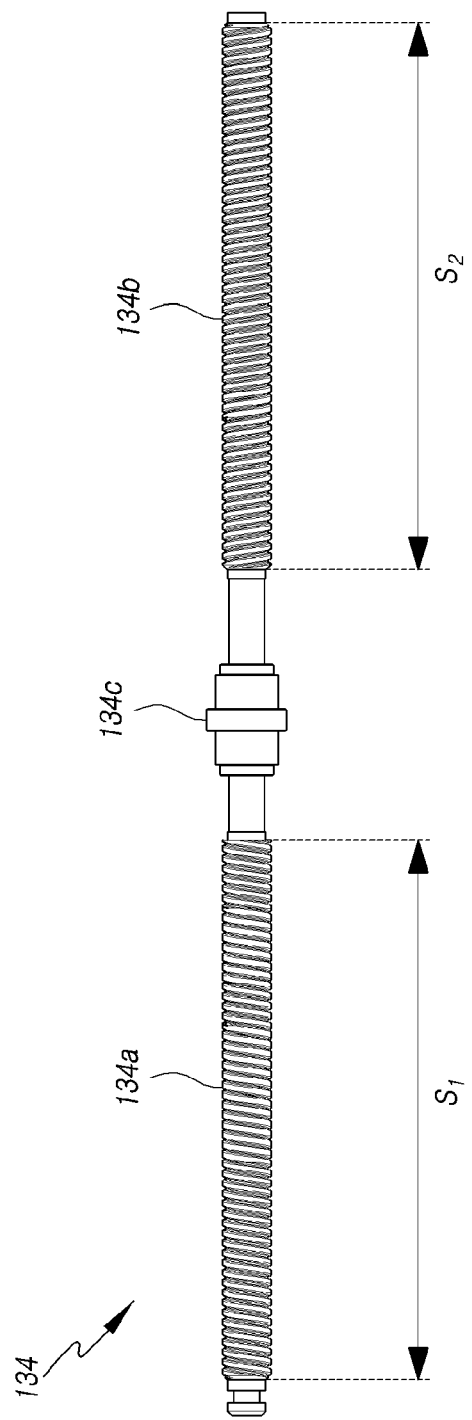
FIG. 6 is a side view illustrating a portion of a steering column for a vehicle according to the present embodiments.
Figure 7:
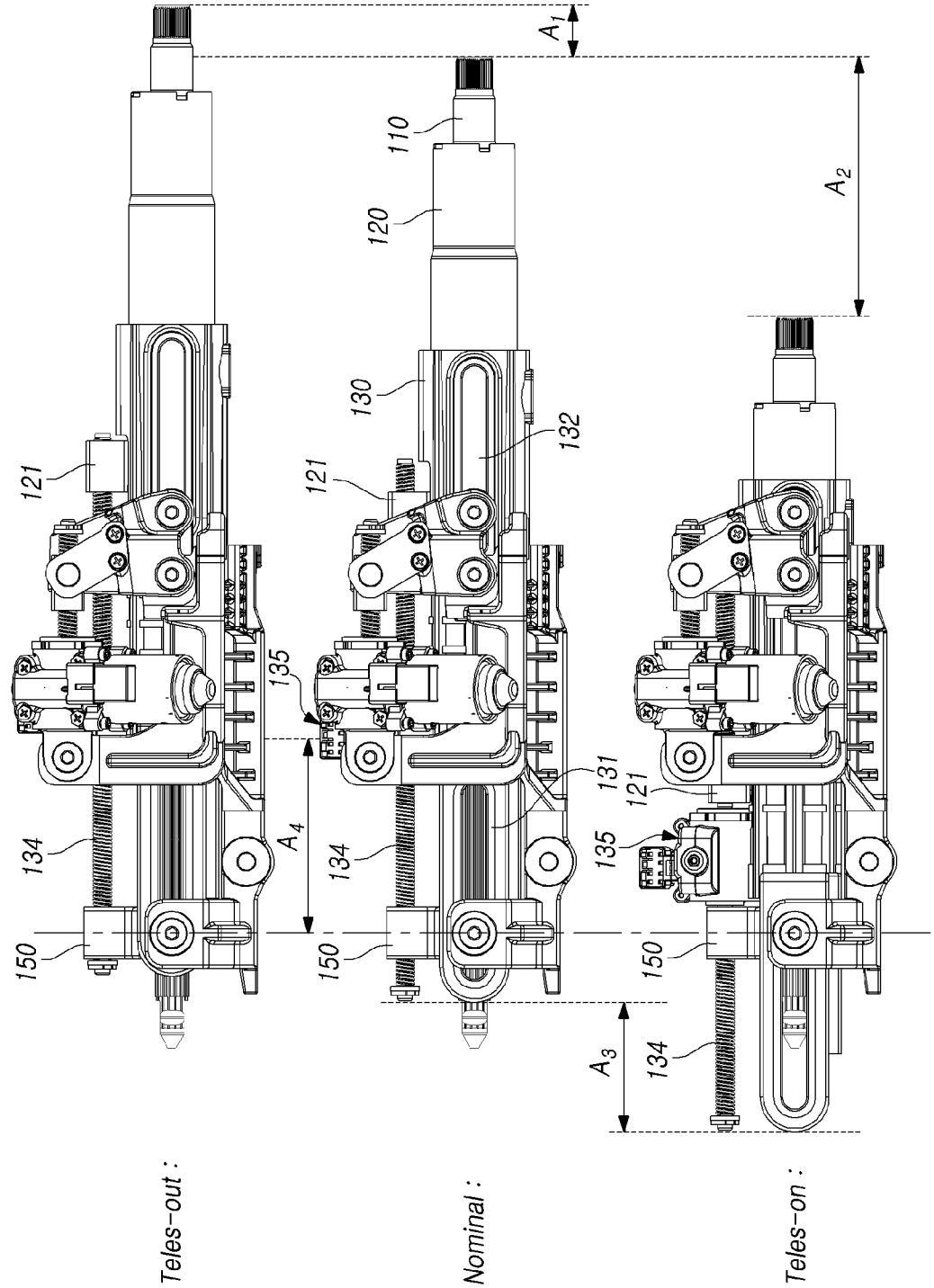
FIG. 7 is a side view illustrating an operation state of a steering column for a vehicle according to the present embodiments.
Figure 8:
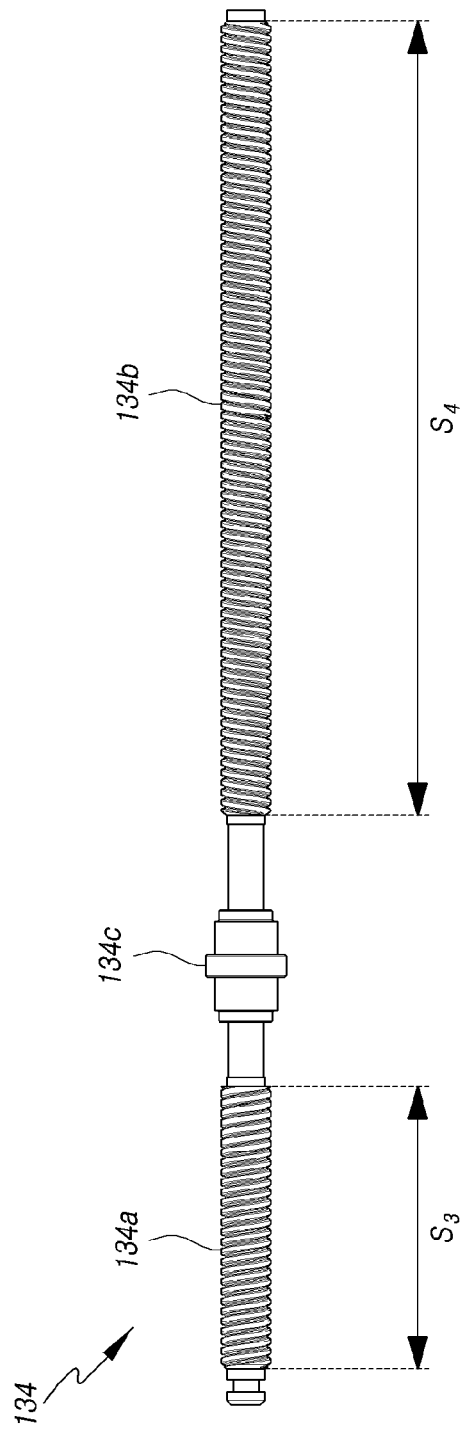
FIG. 8 is a side view illustrating a portion of a steering column for a vehicle according to the present embodiments.
Figure 9:
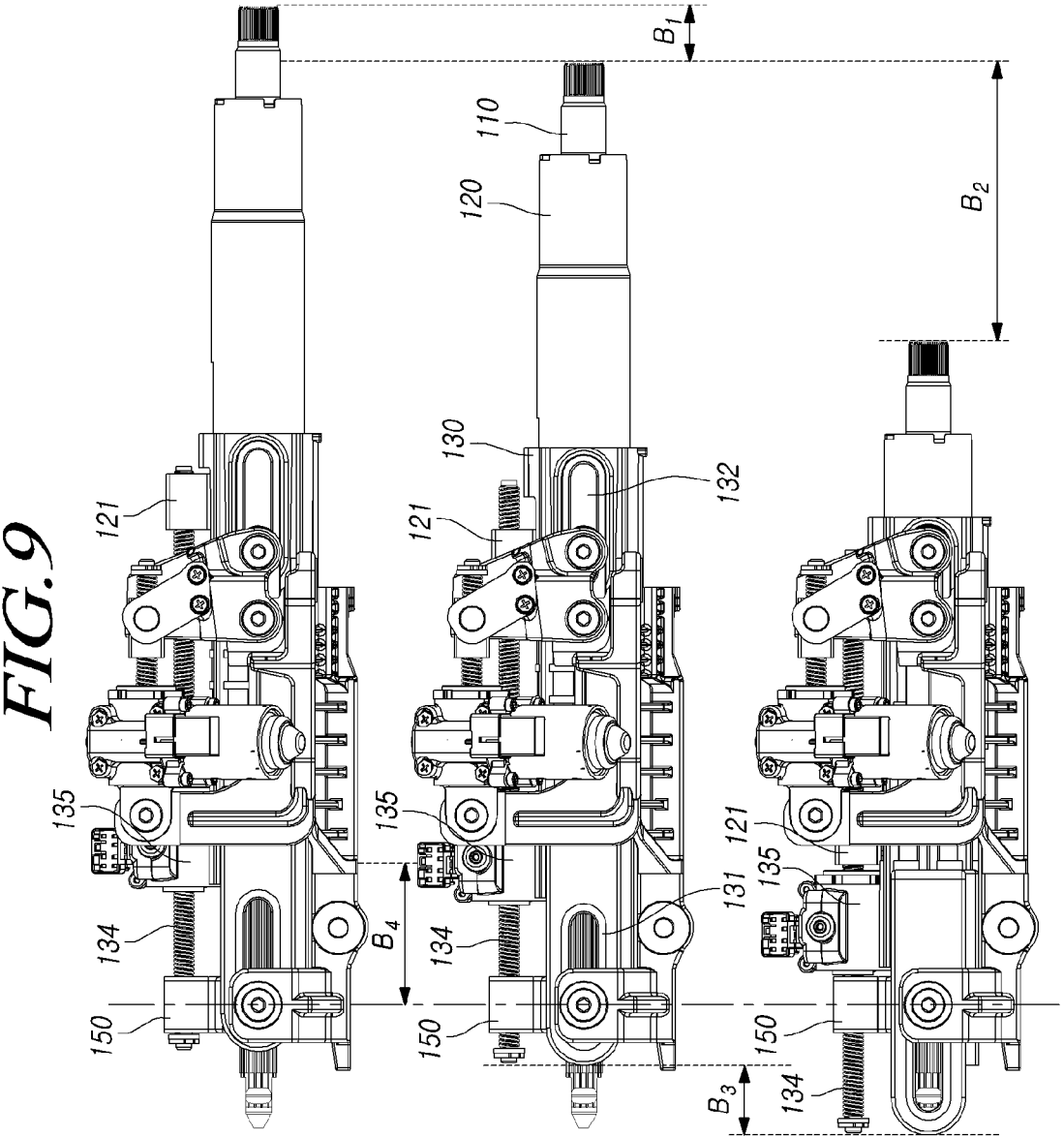
FIG. 9 is a side view illustrating an operation state of a steering column for a vehicle according to the present embodiments.

FIG. 1 is an exploded perspective view illustrating a steering column for a vehicle according to the present embodiments. FIGS. 2 to 4 are a perspective view, a side view, and a plan view illustrating the assembled state of FIG. 1. FIG. 5 is a cross-sectional view of FIG. 3. FIG. 6 is a side view illustrating a portion of a steering column for a vehicle according to the present embodiments. FIG. 7 is a side view illustrating an operation state of a steering column for a vehicle according to the present embodiments. FIG. 8 is a side view illustrating a portion of a steering column for a vehicle according to the present embodiments. FIG. 9 is a side view illustrating an operation state of a steering column for a vehicle according to the present embodiments. FIGS. 10 to 13 are cross-sectional views of a portion of FIG. 3.

Hereinafter, in the detailed description of the present embodiments, 'upper side' refers to a direction toward the steering wheel, and 'lower side' refers to the opposite direction. However, this is merely for an easier understanding and description, and the present embodiments are not limited thereby.

According to the present embodiments, a steering column 100 for a vehicle includes a mounting bracket 140 having a lower end coupled with a first nut screw 150, an upper column 120 having an outer circumferential surface coupled with a second nut screw 121, a first bolt screw 134 including a first bolt part 134a coupled to the first nut screw 150 and a second bolt part 134b coupled to the second nut screw 121, and a telescope driving unit 135 including a first motor 136 rotating the first bolt screw 134.

Referring to FIGS. 1 to 5, a steering shaft 110 includes a first shaft 111 connected with a steering wheel and a second shaft 112 connected with a pinion shaft or a reaction force motor, and the first shaft 111 and the second shaft 112 are coupled via serrations.

The steering shaft 110 is coupled to the inner circumferential surface of the upper column 120. In other words, the first shaft 111 is coupled to the upper column 120 and, upon telescoping, the first shaft 111 is supported and slid on the second shaft 112.

The lower column 130 is formed in a hollow shape to allow the upper column 120 to be inserted thereinto, and the mounting bracket 140 is coupled with the lower column 130 and installed on the vehicle body to support telescoping.

The lower column 130 is provided with the telescope driving unit 135. Telescoping is performed by the operation of the telescope driving unit 135. In the conventional steering column, upon telescoping, the lower column is fixed to the mounting bracket while only the upper column slides in the lower column. In contrast, in the vehicle steering column 100 according to the present embodiments, upon telescoping, the upper column 120 slides in the lower column 130 while the lower column 130 simultaneously slides on the mounting bracket 140. According to the present embodiments, the telescope stroke and telescope speed are increased as compared with the conventional steering column.

Further, it is possible to increase the telescope speed without the need for increasing the power or number of motors to perform telescoping, providing advantages in light of noise, motor costs, and weight.

The structure of the vehicle steering column 100 according to the present embodiments is described in detail. The first nut screw 150 is coupled to a lower end of the mounting bracket 140. The second nut screw 121 is coupled to the outer circumferential surface of the upper column 120. The lower column 130 is provided with the first bolt screw 134 that is rotated by the first motor 136 of the telescope driving unit 135. The first bolt part 134a of the first bolt screw 134 is coupled with the first nut screw 150, and the second bolt part 134b is coupled to the second nut screw 121 so that, as the first bolt screw 134 rotates, the lower column 130 slides on the mounting bracket 140, and the upper column 120 slides on the lower column 130.

The first bolt screw 134 includes the first bolt part 134a and the second bolt part 134b which are treaded in opposite directions, and it has a worm wheel coupling part 134c (see FIG. 12) in the middle thereof. The first bolt part 134a is coupled with the first nut screw 150, from the lower side of the worm wheel coupling part 134c, and the second bolt part 134b is coupled with the second nut screw 121, from the upper side of the worm wheel coupling part 134c.

In other words, the lower column 130 is provided with a first gear housing 1201. The worm wheel coupling part 134c of the first bolt screw 134 is received in the first gear housing 1201, and the first bolt part 134a and the second bolt part 134b are axially projected from the first gear housing 1201.

The first motor 136 is coupled to the first gear housing 1201. A first worm wheel 1202 coupled to the worm wheel coupling part 134c in the first gear housing 1201 and a first worm shaft 1203 coupled to the motor shaft of the first motor 136 are engaged to each other, and the first motor 136 rotates the first bolt screw 134.

Since the first bolt part 134a and the second bolt part 134b are threaded in different directions, when the first bolt screw 134 rotates, the first nut screw 150 and the second nut screw 121 move closer to or away from each other.

In other words, as viewed from the lower column 130, the mounting bracket 140 and the upper column 120 are slid in opposite directions and, as viewed from the mounting bracket 140, the lower column 130 and the upper column 120 are slid in the same direction.

The first nut screw 150 includes a nut part 151 having a screw hole and a body part 152 having a coupling hole 1004.

The first bolt part 134a is coupled to the nut part 151, and the steering shaft 110 is coupled to the body part 152.

As described below, the body part 152 is coupled by a first coupling member 144, between first coupling parts 141 so that the first nut screw 150 is axially fixed to the mounting bracket 140.

Further, the second shaft 112 of the steering shaft 110 is coupled in the coupling hole 1004 of the body part 152 via a bearing, so that the first shaft 111 of the steering shaft 110 is coupled to the upper column 120, and the second shaft 112 is coupled to the first nut screw 150 and supported by the mounting bracket 140.

The nut part 151 radially projects from the body part 152 and is screwed with the first bolt part 134a of the first bolt screw 134 so that the lower column 130 is slid on the mounting bracket 140 when the first bolt screw 134 is rotated by the telescope driving unit 135.

To support a slid of the lower column 130, the lower column 130 has a first guide rail 131 and a second guide rail 132 that have the first coupling member 144 and second coupling member 145, respectively, inserted thereto, which is described below in detail.

The second nut screw 121 is coupled to the outer circumferential surface of the upper column 120, and when the first bolt screw 134 rotates, the upper column 120 and the first shaft 111 coupled with the upper column 120 are slid on the lower column 130.

A first slit 133, axially elongated, is formed in the lower column 130 through the inner and outer surfaces of the lower column 130. When the upper column 120 is inserted into the lower column 130, the second nut screw 121 is inserted through the first slit 133 and projects from the outer surface of the lower column 130 and is coupled with the second bolt part 134b.

An EA block 502 is coupled to the inside of the upper column 120 via a bending plate. A second slit 122, elongated axially, is formed in the upper column 120 through the inner and outer surfaces of the upper column 120, and a bolt 501 penetrates the second nut screw 121 and the second slit 122 and is coupled to the EA block 502.

The bolt 501 is inserted into a lower end of the second slit 122 and, when collapsed, the upper column 120 and the first shaft 111 are slid, and the bending plate is deformed to absorb impact.

In other words, as the telescope driving unit 135 rotates the first bolt screw 134, the lower column 130 is slid on the mounting bracket 140, and the upper column 120 is slid on the lower column 130, thus increasing the telescope stroke and telescope speed as compared with the conventional steering column.

The telescope stroke of the upper column 120 is the sum of the stroke of the lower column 130 and the stroke of the upper column 120. The ratio of the stroke of the lower column 130 to the overall telescope stroke and the telescope speed may be adjusted according to the lead of the first bolt part 134a and the second bolt part 134b.

This is described first with reference to FIGS. 6 and 7. The first bolt part 134a and the second bolt part 134b may be formed with the same lead so that the lower column 130 and the upper column 120 are slid at the same speed.

Since the lower column 130 and the upper column 120 are slid at the same speed, it is preferable to form the first bolt part 134a and the second bolt part 134b in the same length (S1=S2).

As telescoping is performed, the lower column 130 and the upper column 120 are slid up (see reference denotation A1) or down (see reference denotation A2).

As illustrated in the drawings, the second bolt part 134b and the second nut screw 121 are engaged with each other, and the upper column 120 is slid, and the first bolt part 134a and the first nut screw 150 are engaged with each other and the lower column 130 is slid. Thus, the entire stroke (A1+A2) may be significantly increased. Thus, the steering column 100 according to the present embodiments may significantly increase the downward telescoping distance (A2>A1), rendering it possible to secure a space for the driver's convenience during self-driving.

Further, assuming that the first bolt part 134a and the second bolt part 134b have the same lead as that of the bolt screw of the conventional steering column, the lower column 130 and the upper column 120 are simultaneously slid by the first bolt part 134a and the second bolt part 134b so that they may be slid at a twofold telescope speed and thus allows for rapid telescoping despite a significant increase in the overall stroke.

The present embodiments are described with reference to FIGS. 8 and 9. The lead of the first bolt part 134a may be formed to be smaller than the lead of the second bolt part 134b (S3<S4) so that the lower column 130 is slid at a lower speed than the upper column 120.

Although it is illustrated in the drawings that the lead of the first bolt part 134a is identical to the lead of the second bolt part 134b, this is for convenience of illustration, and in the embodiment described below, the lead of the first bolt part 134a is smaller than the lead of the second bolt part 134b unlike in the drawings.

Since the lower column 130 is slid at a lower speed than the upper column 120, it is preferable to form the first bolt part 134a to be shorter than the second bolt part 134b (S3<S4). For example, the length of the second bolt part 134b relative to the length of the first bolt part 134a may be equal to the lead of the second bolt part 134b relative to the lead of the first bolt part 134a.

As compared with the foregoing embodiment, the overall telescope strokes may be rendered to be identical (A1+A2=B1+B2) by forming the overall lengths of the first bolt part 134a and the second bolt part 134b to be the same (S1+S2=S3+S4). In other words, as much as the stroke of the lower column 130 is reduced, the stroke of the upper column 120 is lengthened.

Similarly, since the downward telescoping distance is significantly increased (B2>B1), it is possible to secure a space for the driver's convenience during self-driving.

Further, as the first bolt part 134a is formed to be shorter than the second bolt part 134b so that the stroke of the lower column 130 becomes shorter, the projecting distance of the lower end of the lower column 130 and the first bolt part 134a when slid downward may be reduced (B3<A3), allowing it possible to easily secure an installation space inside the vehicle body and prevent interference with surrounding components.

Further, since the telescope driving unit 135 is located lower (B4<A4), and the first motor 136 is provided in a position farther away from the driver, it is possible to minimize the noise transferred to the driver when telescoping.

Further, the lead of the first bolt part 134a may be rendered to be shorter than the lead of the second bolt part 134b by making the lead of the first bolt part 134a shorter or making the lead of the second bolt part 134b longer. Given the screw self-locking condition, it is preferable to form the first bolt part 134a to be shorter.

In other words, for example, the second bolt part 134b may be formed with the same lead as that of the bolt screw of the conventional bolt screw, and the first bolt part 134*a* may be formed with a shorter lead.

However, in all of the cases where the first bolt part 134*a* is formed with a shorter lead, the second bolt part 134*b* is formed with a longer lead, or the first bolt part 134*a* is formed with a shorter lead and the second bolt part 134*b* is formed with a longer lead, the lower column 130 and the upper column 120 are simultaneously slid, so that they may be more quickly slid, enabling rapid telescoping.

Meanwhile, as described above, the lower column 130 has the first guide rail 131 and the second guide rail 132, and the first coupling member 144 and the second coupling member 145 are inserted into the first guide rail 131 and the second guide rail 132 and are coupled to the mounting bracket 140, supporting a slide of the lower column 130.

Figure 10:
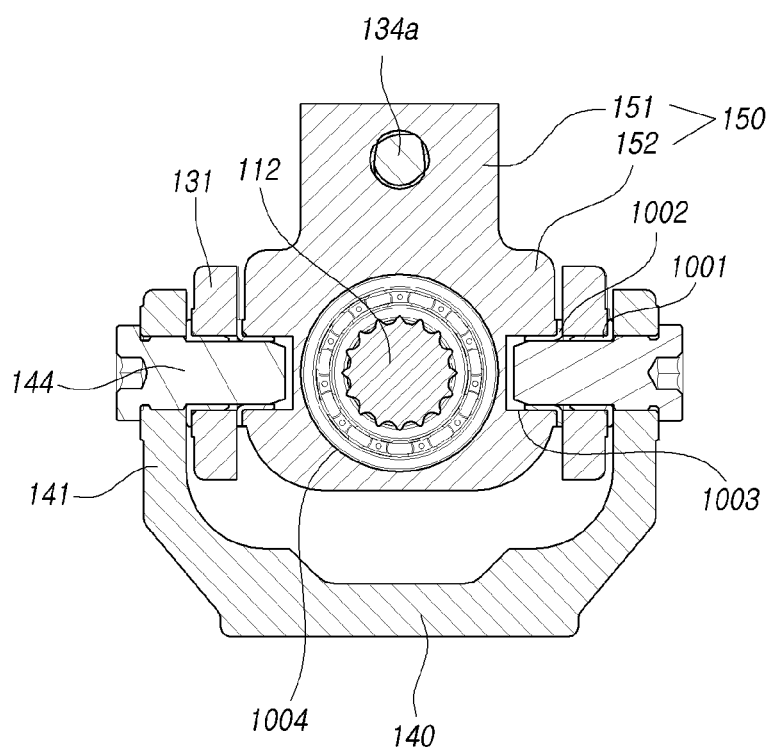
FIGS. 10 to 13 are cross-sectional views of a portion of FIG. 3.

Referring to FIGS. 1 and 10, a pair of first coupling parts 141 are formed on the mounting bracket 140 to face each other with the first nut screw 150 disposed therebetween. The first guide rail 131, axially elongated, is formed in a lower end of the lower column 130 through the inner and outer surfaces, between the first coupling part 141 and the first nut screw 150, and the first coupling member 144 inserted into the first guide rail 131 and coupled to the first nut screw 150 is coupled to the first coupling part 141.

The first guide rail 131 and the first coupling part 141 are provided in order on each of two opposite sides of the first nut screw 150, and the first coupling member 144 is inserted into the first guide rail 131 and coupled to the first coupling part 141 and the first nut screw 150.

In other words, the inner surface of the first guide rail 131 is supported by the first coupling member 144, so that the slide of the lower column 130 is supported.

Further, a first bushing 1001 is provided between the inner surface of the first guide rail 131 and the outer surface of the first coupling member 144, reducing friction when the lower column 130 slides.

Further, an insertion hole 1003 is formed in each of two opposite sides of the first nut screw 150 to allow an end of the first coupling member 144 to be inserted therethrough, and a second bushing 1002 is provided between the inner surface of the insertion hole 1003 and the outer surface of the first coupling member 144, so that the first nut screw 150 is rotatably coupled to the first coupling member 144.

In other words, when tilting is performed by a tilt driving unit 146 described below, the lower column 130 and the upper column 120 are rotated around the first nut screw 150, and friction is reduced by the second bushing 1002.

Figure 11:
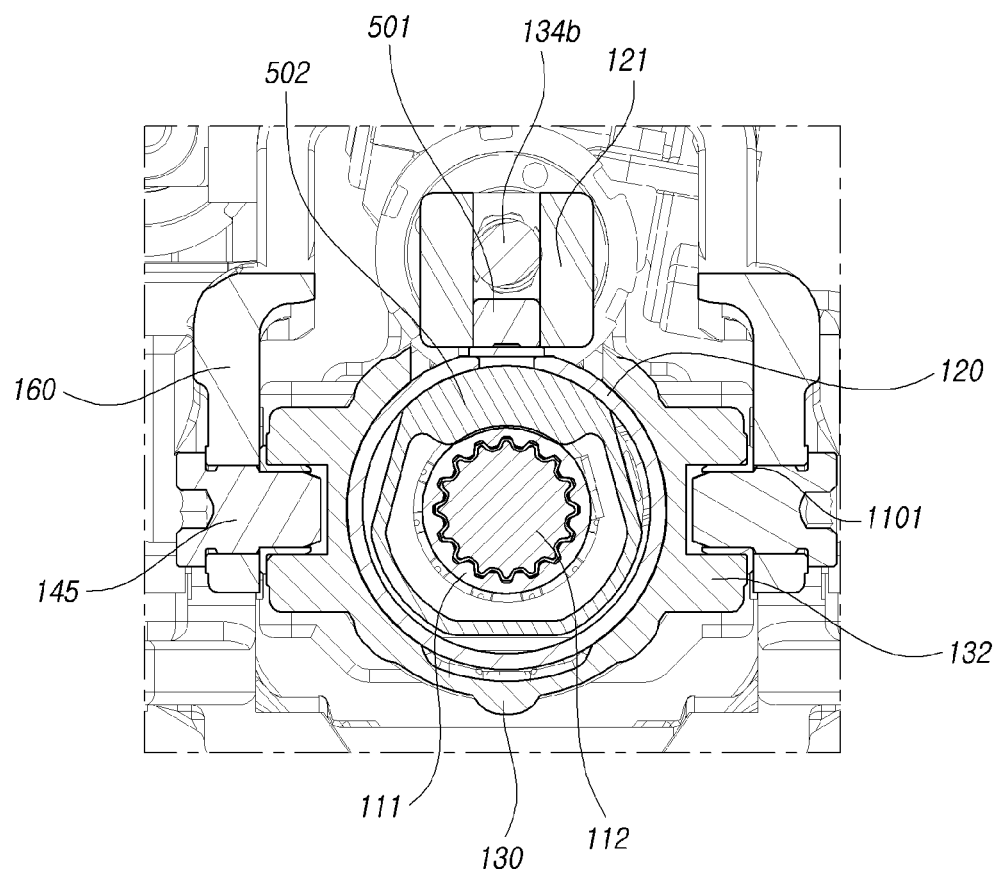

Referring to FIGS. 1 and 11, a pair of second coupling parts 142 are formed on an upper end of the mounting bracket 140 to face each other with the lower column 130 disposed therebetween. A link bracket 160 is hinged to the outer circumferential surface of the second coupling parts 142, and the second guide rail 132, which is formed to be axially elongated as its outer circumferential surface is recessed, is provided in an upper end of the lower column 130, and the second coupling member 145 inserted into the second guide rail 132 is coupled to the link bracket 160.

In other words, the upper end of the lower column 130 is coupled to the mounting bracket 140 via the link bracket 160. The link bracket 160 is hinged to the second coupling parts 142, and the second coupling member 145 is inserted through the link bracket 160 to the second guide rail 132.

The first guide rail 131 and the second guide rail 132 may be formed to have the same length, and the lower column 130 may be slid on the mounting bracket 140 as long as the axial length of the first guide rail 131 and the second guide rail 132.

Further, a third bushing 1101 is provided between the outer surface of the second coupling member 145 and the inner surface of the second guide rail 132, reducing friction when the lower column 130 slides.

As such, as the first guide rail 131 and the second guide rail 132 are provided in the lower column 130, the first coupling member 144 is inserted through the first coupling part 141 and the first guide rail 131 to the first nut screw 150, and the second coupling member 145 is inserted through the second coupling part 142 to the second guide rail 132, the slide of the lower column 130 is supported by the mounting bracket 140.

Figure 12:
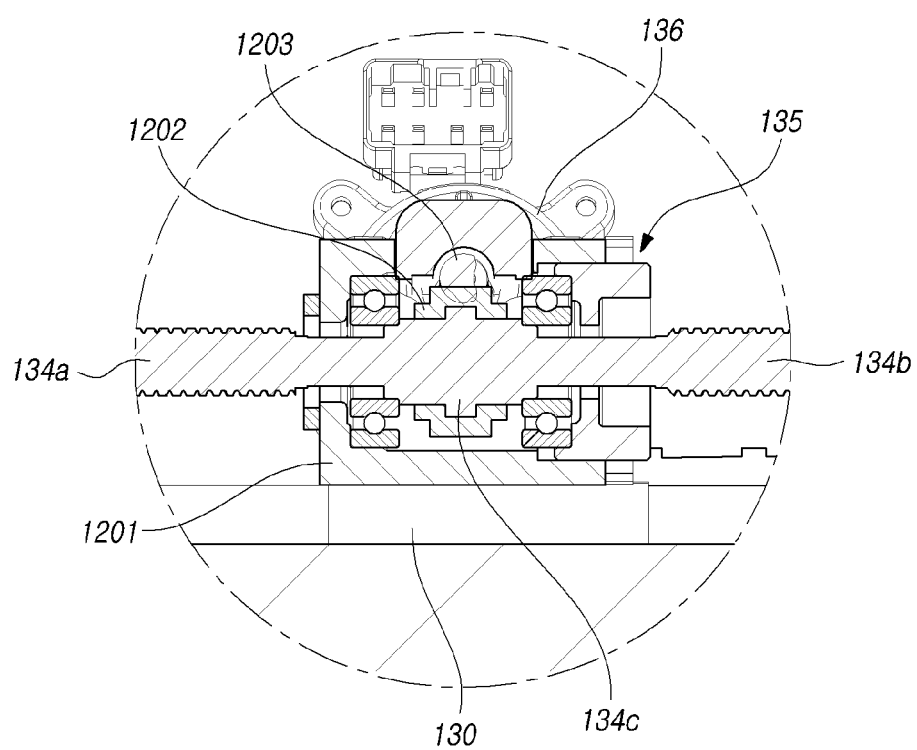

A structure of the telescope driving unit 135 is described with reference to FIG. 12. As described above, the telescope driving unit 135 includes the first gear housing 1201 which is penetrated by the first bolt screw 134, and the first bolt part 134*a* and the second bolt part 134*b* project from the first gear housing 1201 upward and downward, respectively.

The first bolt screw 134 is coupled to the first gear housing 1201 via a bearing, and the first worm wheel 1202 is coupled to the worm wheel coupling part 134*c*.

Further, the first motor 136 is coupled to the first gear housing 1201. The first worm shaft 1203 coupled to the motor shaft of the first motor 136 is engaged with the first worm wheel 1202, inside the first gear housing 1201, so that the first bolt screw 134 is rotated by the first motor 136.

Meanwhile, the tilt driving unit 146 is coupled to the mounting bracket 140, and the tilt driving unit 146 performs tilting while rotating the link bracket 160.

Figure 13:
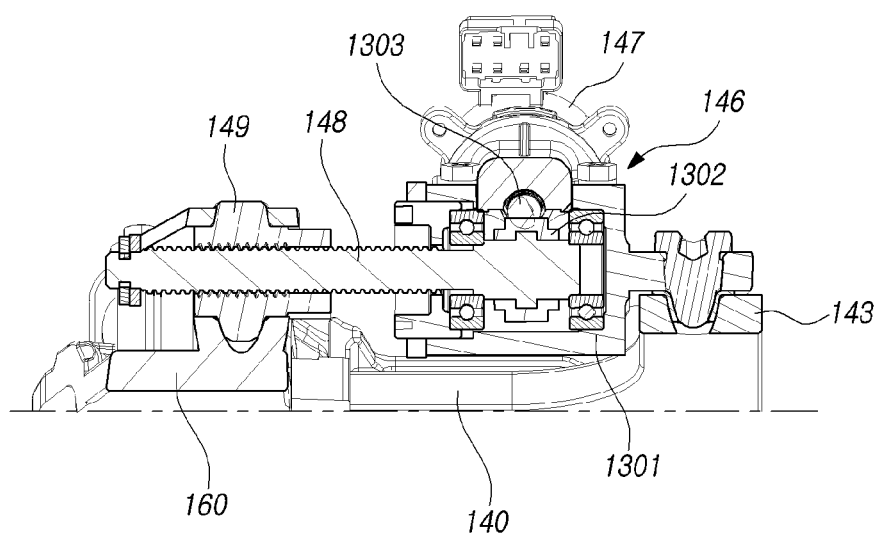

Referring to FIGS. 1 and 13, a third nut screw 149 is hinged to the link bracket 160, and a second bolt screw 148 is coupled to the third nut screw 149. The tilt driving unit 146 including a second motor 147 for rotating the second bolt screw 148 is coupled to the mounting bracket 140.

The tilt driving unit 146 includes a second gear housing 1301 hinged to a third coupling part 143 of the mounting bracket 140 and having the second bolt screw 148 pass therethrough. The bolt part of the second bolt screw 148 projects upward from the second gear housing 1301 and is coupled with the third nut screw 149.

The second bolt screw 148 is coupled to the second gear housing 1301 via a bearing, and a second worm wheel 1302 is coupled to a worm wheel coupling part of the second bolt screw 148.

Further, the second 147 is coupled to the second gear housing 1301. The second worm shaft 1303 coupled to the motor shaft of the second motor 147 is engaged with the second worm wheel 1302, inside the second gear housing 1301, so that the second bolt screw 148 is rotated by the second motor 147.

As described above, since the link bracket 160 is hinged to the second coupling part 142, the second bolt screw 148 is rotated by the tilt driving unit 146, and the third nut screw 149 is slid on the second bolt screw 148. By the slide of the third nut screw 149, the link bracket 160 is rotated, and the second coupling member 145 is supported on the inner surface of the second guide rail 132 while tilting is performed.

In this case, the center point of the tilting is the first nut screw 150 to which the second shaft 112 is inserted and coupled and which is coupled to the first coupling part 141 by the first coupling member 144.

The so-shaped steering column for a vehicle allows for securing of a wide space for the driver's convenience in a telescope-in state by increasing the telescope stroke while securing a space for installing the steering column, spatially easier installation of the steering column despite the increased telescope stroke, and quick telescopic motion without increasing motor power, thereby rapidly securing a space for the driver's convenience without degrading anti-noise capability.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

As described above, the disclosure of Korean Patent Application No. 10-2019-0111842 filed on Sep. 10, 2019 is herein incorporated by reference in its entirety. The present patent application claims priority to other applications to be filed in other countries, the disclosures of which are also incorporated by reference herein in their entireties.

The invention claimed is:

1. A steering column for a vehicle, comprising:
a mounting bracket having a lower end coupled with a first nut screw;
an upper column having an inner circumferential surface coupled with a steering shaft and having an outer circumferential surface coupled with a second nut screw; and
a lower column including a first bolt screw including a first bolt part coupled to the first nut screw and a second bolt part coupled to the second nut screw and a telescope driving unit including a first motor for rotating the first bolt screw,
wherein the first nut screw includes a nut part having a screw hole through which the first bolt part is inserted and a body part having a coupling hole through which the steering shaft is inserted.

2. The steering column of claim 1, wherein the first bolt part and the second bolt part are threaded in opposite directions.

3. The steering column of claim 2, wherein the first bolt part and the second bolt part have the same lead.

4. The steering column of claim 2, wherein a lead of the first bolt part is smaller than a lead of the second bolt part.

5. The steering column of claim 1, wherein the telescope driving unit includes a first worm wheel coupled to the first bolt screw and a first worm shaft coupled to a motor shaft of the first motor and engaged with the first worm wheel.

6. The steering column of claim 1, wherein a pair of first coupling parts provided to face each other with the first nut screw disposed therebetween are formed on the mounting bracket,
wherein a lower end of the lower column has a first guide rail formed to be axially elongated through an inner and outer surface thereof, between the first coupling parts and the first nut screw, and
wherein a first coupling member inserted to the first guide rail and coupled to the first nut screw is coupled to the first coupling parts.

7. The steering column of claim 6, wherein a first bushing is provided between an inner surface of the first guide rail and an outer surface of the first coupling member.

8. The steering column of claim 6, wherein an insertion hole is formed in each of two opposite sides of the first nut screw to allow an end of the first coupling member to be inserted therethrough, and
wherein a second bushing is provided between an inner surface of the insertion hole and an outer surface of the first coupling member.

9. The steering column of claim 6, wherein a pair of second coupling parts provided to face each other with the lower column disposed therebetween are formed on an upper end of the mounting bracket,
wherein a link bracket is hinged to outer circumferential surfaces of the second coupling parts,
wherein an upper end of the lower column is formed with an axially elongated second guide rail as an outer circumferential surface thereof is recessed, and
wherein a second coupling member inserted to the second guide rail is coupled to the link bracket.

10. The steering column of claim 9, wherein the first guide rail and the second guide rail have the same axial length.

11. The steering column of claim 9, wherein a third bushing is provided between an outer surface of the second coupling member and an inner surface of the second guide rail.

12. The steering column of claim 9, wherein a third nut screw is hinged to the link bracket,
wherein a second bolt screw is coupled to the third nut screw, and
wherein a tilt driving unit including a second motor for rotating the second bolt screw is coupled to the mounting bracket.

13. The steering column of claim 12, wherein the tilt driving unit includes a second worm wheel coupled to the second bolt screw and a second worm shaft coupled to a motor shaft of the second motor and engaged with the second worm wheel.

* * * * *